UNITED STATES PATENT OFFICE.

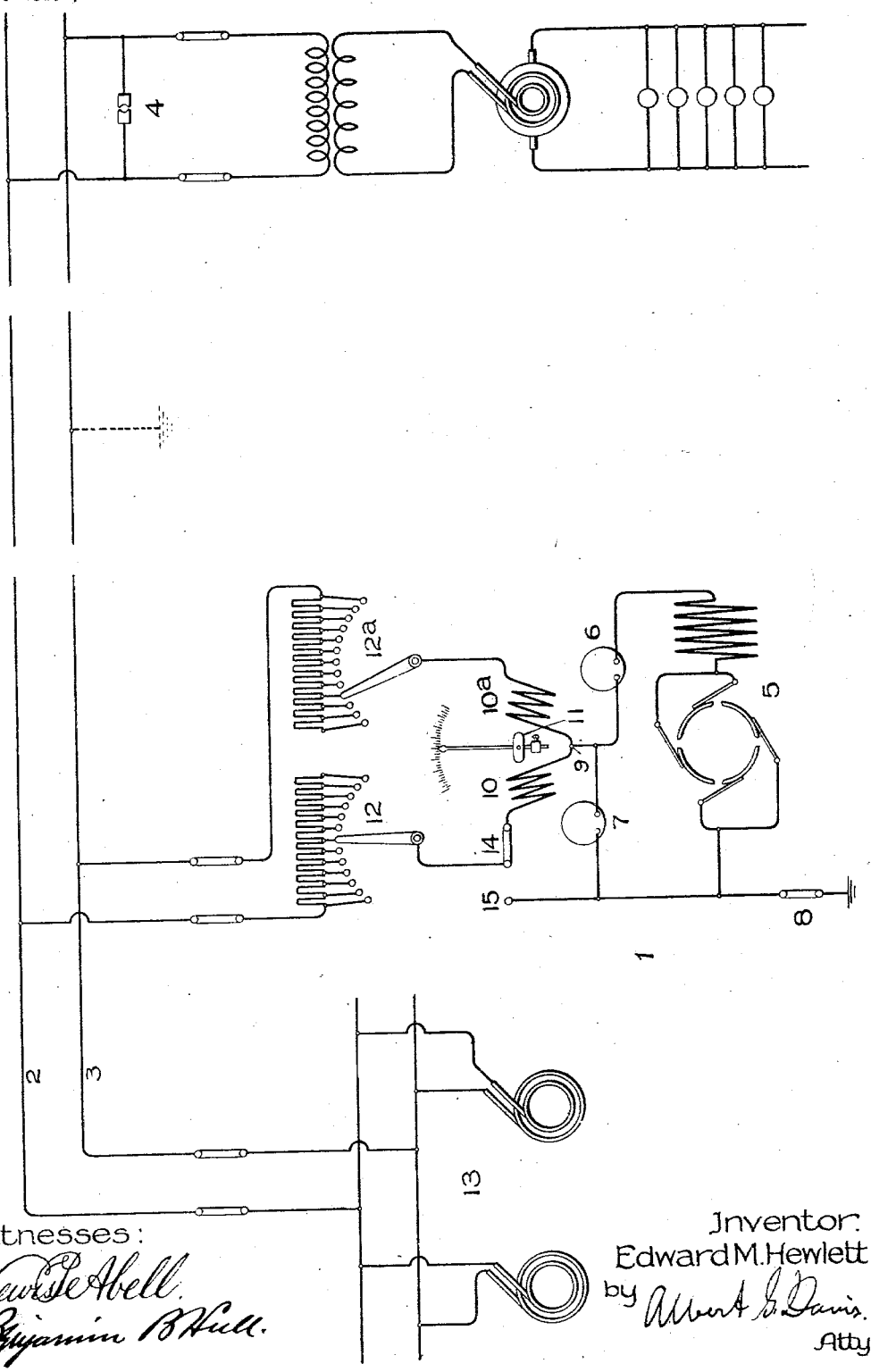

EDWARD M. HEWLETT, OF SCHENECTADY, NEW YORK, ASSIGNOR TO THE GENERAL ELECTRIC COMPANY, OF NEW YORK.

LOCATING GROUNDS ON ELECTRIC CIRCUITS.

SPECIFICATION forming part of Letters Patent No. 678,878, dated July 23, 1901.

Application filed March 14, 1900. Serial No. 8,586. (No model.)

*To all whom it may concern:*

Be it known that I, EDWARD M. HEWLETT, a citizen of the United States, residing at Schenectady, in the county of Schenectady and State of New York, have invented certain new and useful Improvements in Locating Grounds on Electric Circuits, (Case No. 854,) of which the following is a specification.

In operating electrical distribution systems considerable difficulty is experienced in locating grounds when they occur in the system, and much valuable time is spent and great annoyance is caused by the failure to know quickly just where the ground has occurred. It is the object of my invention to permit the ground to be located from the distributing-station, so that a lineman may be sent directly to the spot where the damage exists and the line quickly put into serviceable condition.

In carrying out my invention I provide at the distributing-station a source of high electric potential, by which an arc may be formed at the point at which the ground occurs by connecting the high-potential source with the distributing system. Connected to the two distributing-mains is a differential indicator, which may be adjusted to a zero position by means of variable resistances or other devices, so that in a normal condition of the line, supposing no leakage exists at any point, the instrument when connected with the testing source would stand at a determinate position; but if a leak exists on either line the two forces operating the instrument would be unbalanced and a deflection given. When the instrument shows a deflection, the resistances or other compensating devices may be adjusted until it is again brought to zero or the point at which it would stand if the line were not grounded, and the amount of resistance so added affords a factor from which the point at which the ground occurs may be easily determined. I provide also a switch at the distributing-station by which the grounded main may be connected to a return-wire, so that the resistance of the loop being tested may be easily ascertained. The preferable arrangement is to so place the switch that the two mains may be connected in series relation. With this organization the two sides of the differential instrument are included in a loop, one end of which is grounded at the station through the arc-machine or other source of high potential and the other end of which is a possible ground at some point out on the system. This loop is normally open; but each substation is provided with means for closing it, so that an attendant may insert a plug and complete the testing-circuit when advised by telephone to do so.

My invention therefore comprises a distributing system provided at some point with an instrument and means for determining the resistance of each side of the circuit to any point within the range of the system.

It comprises other features, the novelty of which will be hereinafter described, and definitely indicated in the claims appended hereto.

In the accompanying drawing, which is a diagram illustrating my improvements, 1 represents a distributing-station, at which are located the supply-generators and the testing apparatus.

2 and 3 represent feeders leading from the distributing-station to outlying points. Where there are substations, I provide means at each substation, such as a plug-switch, (indicated at 4,) by which a cross connection may be made between the distributing-mains. Where no such distributing-station is employed, an auxiliary feeder insulated from the main feeder, but connected at its outer end, may be employed. At the generating-station I provide a source of high potential—as, for example, an arc-machine 5, including an ampere-meter 6 in series relation and a voltmeter 7 in shunt relation to its leads, one end of the machine being grounded at the station through a switch 8 and the other end being connected with a point 9, common to the two coils, of a differential indicator 10 $10^a$, the index of which is provided with an armature 11, mounted in the common field of the coils.

The instrument may be variously organized, and the type shown in the drawing is merely illustrative. This comprises two inclined coils 10 $10^a$, which when equally energized support the needle at its zero position; but when one predominates over the other the armature tends to set itself more nearly in alinement with the predominating coil, thereby tilting the index toward said coil. The free terminals of these two coils connect with variable resistances 12 12ª, the ends of which connect with the distribution-leads 2 and 3.

13 represents the generating outfit of the station, which may be of any approved or desired type. In the return-lead for the testing-generator is a switch 14, which may be shifted from the contact which puts the coil 10 in circuit to a normally open contact 15, by which the distributing-mains are put in series relation to the high-potential machine 5, and when so shifted the resistance of the distributing-mains may be easily determined.

When the system is in normal operation, no ground exists. If the switches are closed, the coils 10 10ª will be equally energized and the indicator will stand at zero. In case of a ground, however, the needle will tilt toward that side of the instrument containing the coil corresponding to the side grounded. In such case the switch 14 is in the position indicated in the diagram and the ground-switch 8 is closed and the arc-generator started. This generates sufficient potential to spring an arc at the point where the ground occurs, thereby making a grounded circuit for the arc-machine, one ground existing at the station and the other at the damaged point on the line. Before connecting up the arc-machine the central-station attendant will have telephoned to a substation, instructing the attendant to complete the cross connection at the plug-switch 4. This completes a closed loop, including the two coils 10 10ª, one side of which is of less resistance than the other—namely, that on which the ground occurs. Either or both of the resistances 12 12ª are then adjusted until the needle of the indicator returns to zero, and the amount of resistance cut in during this manipulation will be double the resistance between the substation at which the cross connection 4 was established and the ground, provided the mains are of the same cross-section, from which by an easy calculation the distance may be determined and the ground instantly located. If the mains differ, the distance may be computed from known data as to their character. It is not essential on all systems that a high-potential source be used on the testing-circuit, as the differential instrument may be sufficiently refined to respond to a ground under a low-potential source.

What I claim as new, and desire to secure by Letters Patent of the United States, is—

1. In a system of electrical distribution, means for locating the position in the circuit of a ground comprising a generator having one pole grounded, connections in parallel between the other pole and the sides of the circuit, and means for determining the relative resistance of the two branches of the system to the point at which a ground may exist.

2. In a system of multiple-arc electrical distribution, means for completing a cross connection of the distributing-mains at a point distant from the distributing-station, and means for determining the relative resistance of the two branches of the distribution-circuit from the distributing-station to a point at which the leakage may occur.

3. In a system of electrical distribution, a grounded source of high potential at the distributing-station, means for grounding one pole, means for connecting the other pole in parallel relation to the distributing-mains, and means for determining the resistance of each branch circuit thus produced to any point in the system at which a ground may occur.

4. In a system of electrical distribution, a differential instrument located at a determinate point of the system, the two sides of which connect with the distributing-mains, means for imposing potential in parallel on said mains, and means for determining the relative resistance of the two branches to any point at which a ground may occur.

5. In a system of electrical distribution, a high-potential generator, located at a determinate point, one end of which is grounded, a differential instrument having its two controlling-coils in parallel relation to the other terminal of the generator, a variable resistance in series with each coil, and connections between the resistances and the distributing-mains.

In witness whereof I have hereunto set my hand this 10th day of March, 1900.

EDWARD M. HEWLETT.

Witnesses:
BENJAMIN B. HULL,
MABEL E. JACOBSON.